United States Patent
Westerman

(10) Patent No.: US 9,569,045 B2
(45) Date of Patent: Feb. 14, 2017

(54) STYLUS TILT AND ORIENTATION ESTIMATION FROM TOUCH SENSOR PANEL IMAGES

(71) Applicant: Apple Inc., Cupertino, CA (US)

(72) Inventor: Wayne Carl Westerman, Burlingame, CA (US)

(73) Assignee: Apple Inc., Cupertino, CA (US)

(*) Notice: Subject to any disclaimer, the term of this patent is extended or adjusted under 35 U.S.C. 154(b) by 4 days.

(21) Appl. No.: 14/284,316

(22) Filed: May 21, 2014

(65) Prior Publication Data

US 2015/0338949 A1 Nov. 26, 2015

(51) Int. Cl.
*G06F 3/044* (2006.01)
*G06F 3/0488* (2013.01)
*G06F 3/041* (2006.01)

(52) U.S. Cl.
CPC ............ *G06F 3/044* (2013.01); *G06F 3/0416* (2013.01); *G06F 3/0488* (2013.01)

(58) Field of Classification Search
CPC .... G06F 3/03545; G06F 3/044; G06F 3/0488; G06F 3/0416
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,764,222 A | 6/1998 | Shieh | |
| 5,790,104 A | 8/1998 | Shieh | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,446,374 B2 | 5/2013 | Westerman | |

(Continued)

FOREIGN PATENT DOCUMENTS

| | | | |
|---|---|---|---|
| JP | 2000-163031 A | 6/2000 | |
| JP | 2002-342033 A | 11/2002 | |
| WO | WO 2014065203 A1 * | 5/2014 | ........... G06F 3/0325 |

OTHER PUBLICATIONS

Final Office Action mailed Feb. 2, 2012, for U.S. Appl. No. 12/269,823, filed Nov. 12, 2008, 17 pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Latanya Bibbins
(74) *Attorney, Agent, or Firm* — Morrison & Foerster

(57) ABSTRACT

The detection of an orientation of a stylus relative to a touch sensitive surface is disclosed. In one example, a touch image of the stylus tip and the hand used to grasp the stylus can be captured by the touch sensor panel and analyzed to determine the stylus' orientation relative to the surface of the touch sensor panel. The analysis can include estimating the size of the user's hand, determining the distance away from the user's hand at which the stylus tip makes contact with the touch sensor panel, and determining an angle of tilt based on the estimated size of the user's hand and the distance between the tip and the user's hand.

24 Claims, 11 Drawing Sheets

(56) References Cited

U.S. PATENT DOCUMENTS

| | | |
|---|---|---|
| 8,479,122 B2 | 7/2013 | Hotelling et al. |
| 2003/0080946 A1 | 5/2003 | Chuang |
| 2005/0275637 A1 | 12/2005 | Hinckley et al. |
| 2006/0025218 A1 | 2/2006 | Hotta |
| 2006/0197753 A1 | 9/2006 | Hotelling |
| 2007/0139395 A1 | 6/2007 | Westerman et al. |
| 2007/0152966 A1 | 7/2007 | Krah et al. |
| 2007/0152976 A1 | 7/2007 | Townsend et al. |
| 2007/0176906 A1 | 8/2007 | Warren |
| 2008/0012835 A1 | 1/2008 | Rimon et al. |
| 2009/0174679 A1 | 7/2009 | Westerman |
| 2010/0117961 A1 | 5/2010 | Westerman |
| 2013/0082976 A1* | 4/2013 | Kang ................... G06F 3/0418 345/174 |
| 2014/0002407 A1* | 1/2014 | Badaye ................ G06F 3/0416 345/174 |
| 2015/0261374 A1* | 9/2015 | Eguchi ................ G06F 3/0325 345/173 |

OTHER PUBLICATIONS

Non-Final Office Action mailed Jun. 23, 2011, for U.S. Appl. No. 12/269,823, filed Nov. 12, 2008, 16 pages.

Non-Final Office Action mailed May 24, 2012, for U.S. Appl. No. 12/269,823, filed Nov. 12, 2008, 15 pages.

Non-Final Office Action mailed Nov. 8, 2012, for U.S. Appl. No. 12/269,823, filed Nov. 12, 2008, 12 pages.

Notice of Allowance mailed Mar. 4, 2013, for U.S. Appl. No. 12/269,823, filed Nov. 12, 2008, 8 pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

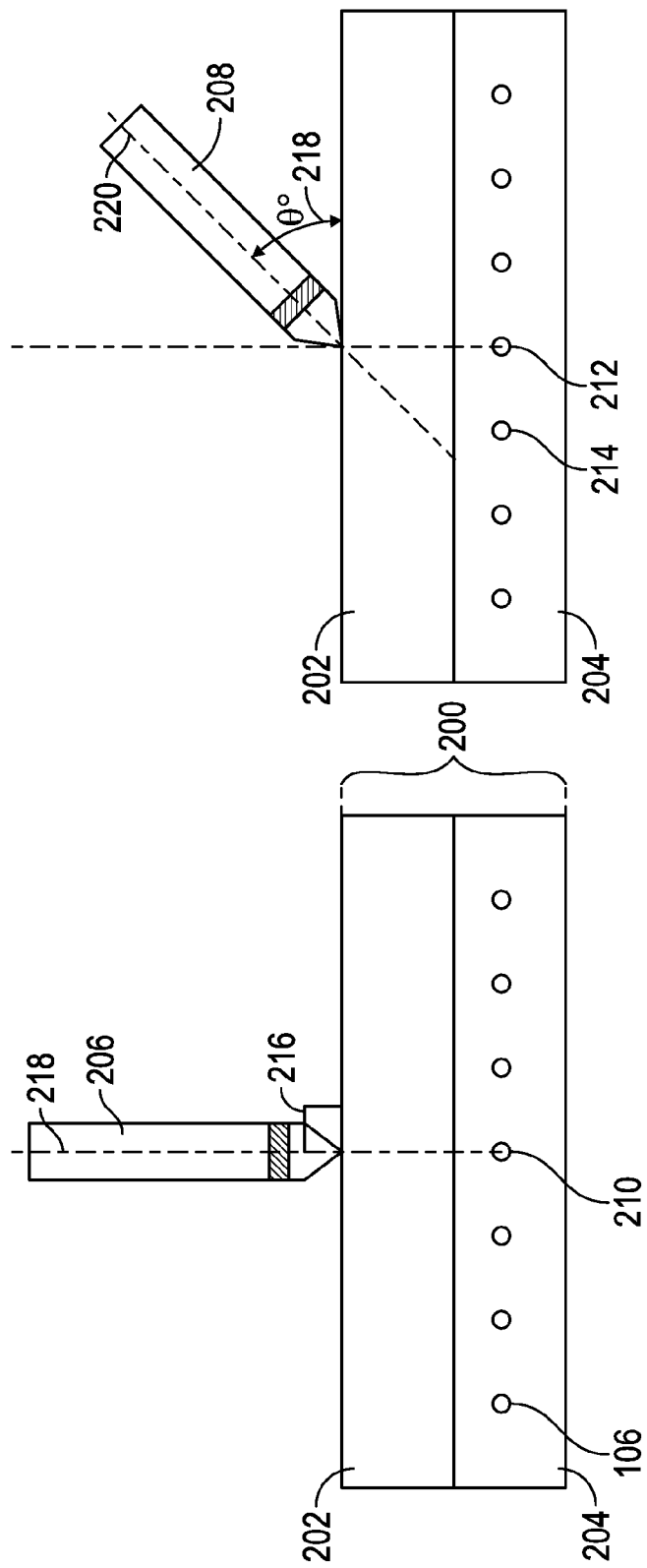

STYLUS TILT AND ORIENTATION ESTIMATION FROM TOUCH SENSOR PANEL IMAGES

FIELD OF THE DISCLOSURE

This relates to a touch sensitive device that can receive both inputs from a user's hand as well as inputs from a stylus that can be held in the user's hand and, more particularly, to methods for detecting the stylus' tilt and orientation based on touch images acquired by the touch sensitive device.

BACKGROUND OF THE DISCLOSURE

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus, or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

As touch sensing technology continues to improve, touch sensitive devices are increasingly being used to compose and mark-up electronic documents. In particular, styli have become popular input devices as they emulate the feel of traditional writing instruments. When a stylus interacts with a touch sensitive device, information about the stylus' orientation relative to the touch sensitive device (i.e., the tilt of the stylus) can allow the touch sensitive device to more accurately map the stylus' location on the touch sensor panel by minimizing the parallax error between the stylus tip and the touch nodes of the touch sensor panel.

SUMMARY OF THE DISCLOSURE

This relates to detection of an orientation of a stylus relative to a touch sensitive surface. In one example, a touch image of the stylus tip and the hand used to grasp the stylus can be captured by the touch sensor panel and analyzed to determine the stylus' orientation relative to the surface of the touch sensor panel. The analysis can include estimating the size of the user's hand, determining the distance away from the user's hand at which the stylus tip makes contact with the touch sensor panel, and determining an angle of tilt based on the estimated size of the user's hand and the distance between the tip and the user's hand.

BRIEF DESCRIPTION OF THE DRAWINGS

FIGS. 2a and 2b illustrate exemplary interactions between a stylus and a touch sensor panel according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to a touch sensor panel that can estimate a stylus' orientation relative to the touch sensor panel based on an acquired touch image of a user's hand grasping the stylus as well as the stylus itself that can be in contact with the touch sensor panel.

Although examples disclosed herein may be described and illustrated herein in terms of mutual capacitance, it should be understood that the examples are not so limited, but are additionally applicable to any capacitive touch sensor panel such as a self-capacitive touch sensor panel. Also, although examples disclosed herein may be described and illustrated in terms of a hand and stylus that can be in contact with the touch sensor panel, it should be understood that the examples are not so limited, but are additionally applicable to a hand and stylus that are in close proximity to the touch sensor panel.

Figure 1:
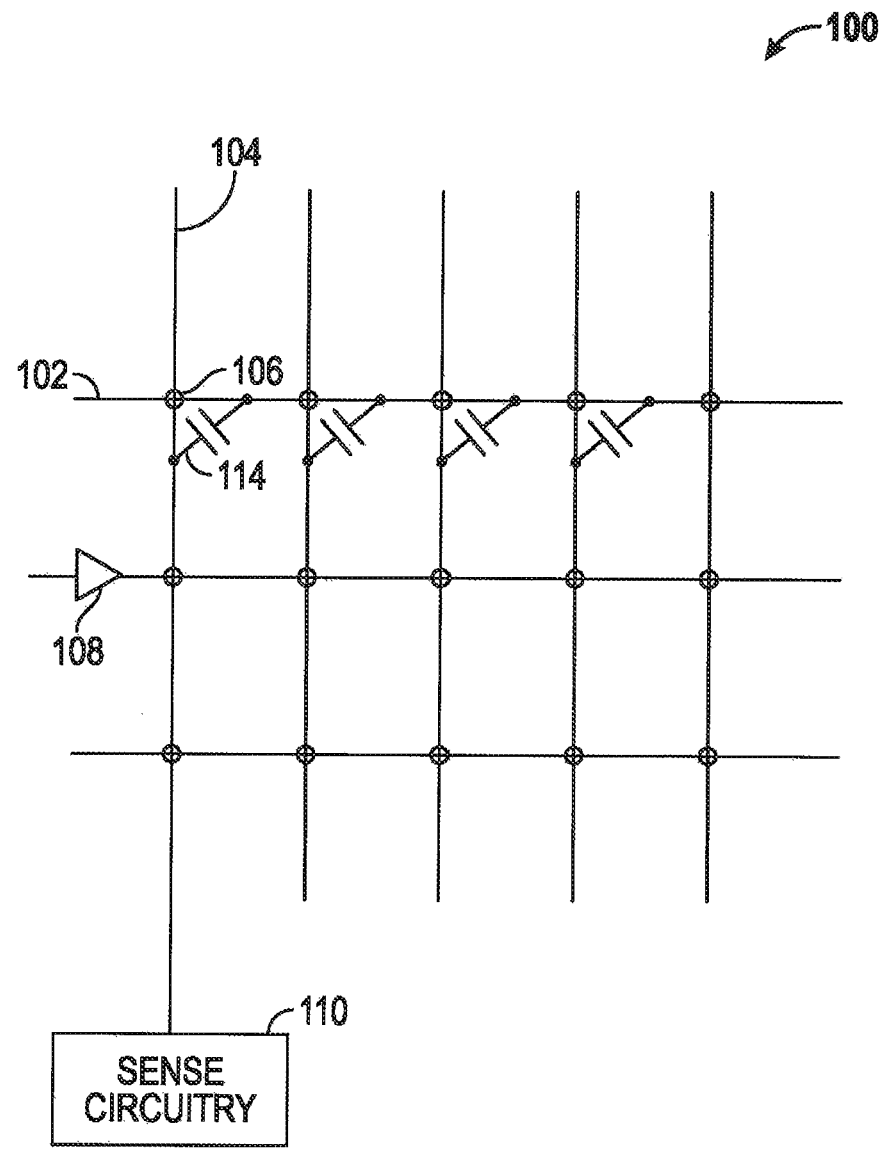
FIG. 1 illustrates an exemplary mutual capacitance touch sensor circuit according to examples of the disclosure.

FIG. 1 illustrates an exemplary touch sensor panel 100 according to some examples of the disclosure. Touch sensor panel 100 can include an array of touch nodes 106 that can be formed by a two-layer electrode structure separated by a dielectric material, although in other examples the electrodes can be formed on the same layer. One layer of electrodes can include a plurality of drive lines 102 positioned perpendicular to another layer of electrodes comprising a plurality of sense lines 104, with each of the nodes 106 having an associated mutual capacitance 114 (also referred to as coupling capacitance), although in other examples, the drive and sense lines can be positioned in non-orthogonal arrangements. The drive lines 102 and sense lines 104 can cross over each other in different planes separated from one another by a dielectric. Each point in which a drive line 102 intersects a sense line 104 can create a touch node 106. Thus, for example, a panel which contains 20 drive lines 102 and 15 sense lines 104 will have 300 touch nodes available to detect touch or proximity events.

Drive lines 102 (also referred to as rows, row traces, or row electrodes) can be activated by a stimulation signal provided by respective drive circuits 108. Each of the drive circuits 108 can include an alternating current (AC) or unipolar pulsatile voltage source referred to as a stimulation signal source. To sense touch event(s) on the touch sensor panel 100, one or more of the drive lines 102 can be stimulated by the drive circuits 108, and the sense circuitry 110 can detect the resulting change in the charge coupled onto the sense lines 104 in the form of a change in the amplitude of the coupled stimulation signal. The change in voltage amplitude values can be indicative of a finger or object touching or in proximity to the panel. The detected voltage values can be representative of node touch output values, with changes to those output values indicating the node locations 106 where the touch or proximity events occurred and the amount of touch that occurred at those location(s).

FIG. 2a illustrates an exemplary interaction between a stylus and a touch sensor panel according to examples of the disclosure. As illustrated, a stylus 206 can be in contact with a touch sensitive device 200. The touch sensitive device can include a touch sensor panel 204 that has a cover glass 202 disposed on top of it. The touch sensor panel 204 can include touch nodes 106 as described above. The stylus 206 can make contact with the touch sensitive device 200 via the cover glass 202. When the stylus comes into contact with the touch sensitive device 200, it can capacitively couple with the touch nodes 106 causing a change in the mutual capacitance between the drive lines and sense lines. The closer in proximity the stylus tip is to a touch node 106, the greater the change in mutual capacitance that can occur. The stylus 206 can have an orientation axis 218. The orientation axis 218 (parallel to the body of the stylus) can form an angle relative to the cover glass 202 depicted at 216. As depicted in the example of FIG. 2a, the orientation axis 218 can be at an angle 216 of 90° as an example. To a user who is situated above the stylus looking down, it can appear that the stylus is touching a portion of the cover glass 202 corresponding to touch node 210. The touch sensor panel can detect the strongest signal at node 210, because the stylus tip is closest to node 210 than the other touch nodes. Since the user's perception matches the touch sensor panel's perception, there may be no parallax error.

FIG. 2b illustrates an exemplary interaction between a stylus and a touch sensor panel in which a parallax error may occur according to examples of the disclosure. In this example the stylus' 208 orientation axis 220 may be tilted such that it forms an angle θ° depicted at 218. In this example the angle is not orthogonal as was depicted in FIG. 2a. In this example, a user who is situated above and looking down may perceive the stylus 208 to be touching the portion of the cover glass 202 corresponding to touch node 214. However, the device may register the touch of the stylus tip at node 212 (i.e., detect the strongest signal) since it is the node that is the closest in proximity to the tip of the stylus. Since the user's perception and the touch sensitive device's perceptions do not match, a parallax error may occur.

Therefore, it may be useful for the touch sensitive device to be able to estimate the tilt of a stylus so as to correct for the above described parallax error. When a user is grasping a stylus, the position of the stylus tip can change relative to the hand that is grasping it. By acquiring a touch image of the hand that is grasping the stylus as well a touch image of the tip of the stylus and comparing their relative positions, an estimation of the stylus orientation can be achieved.

Figure 3A:
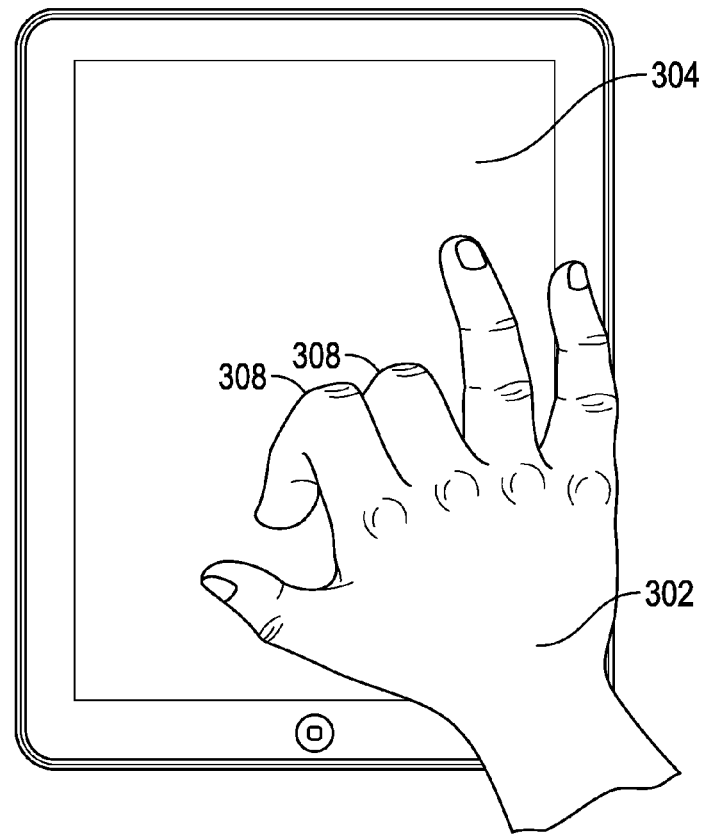
FIGS. 3a through 3d illustrate exemplary touches on a touch sensor panel by a user's hand according to examples of the disclosure.
Figure 3B:
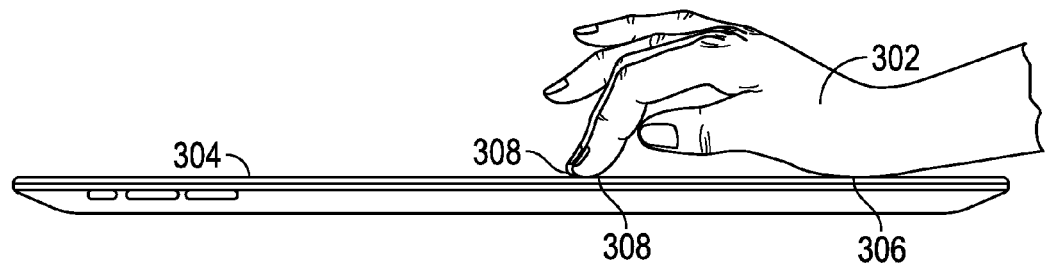
Figure 3C:
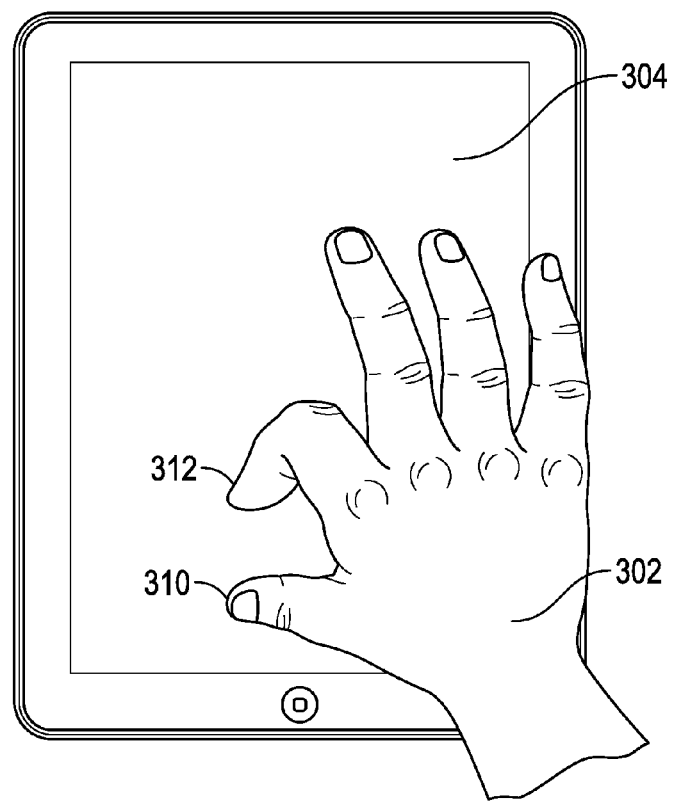
Figure 3D:
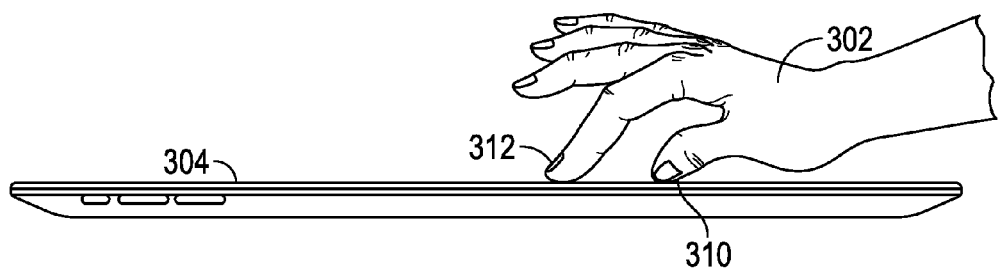

In order to compare the position of the stylus tip to the position of the hand, the touch sensitive device may need to identify a hand from an acquired touch image. FIGS. 3a through 3d illustrate exemplary touches on a touch sensor panel by a user's hand according to examples of the disclosure. FIGS. 3a and 3b illustrate two views of a hand 302 touching a touch sensor panel 304 such that only the palm of the hand 306 and two fingers 308 are making contact with the touch sensor panel. FIGS. 3c and 3d illustrate two views of the hand 302 touching a touch sensor panel 304 such that only a thumb of the hand 310 and a finger 312 are making contact with the touch sensor panel.

Figure 4B:
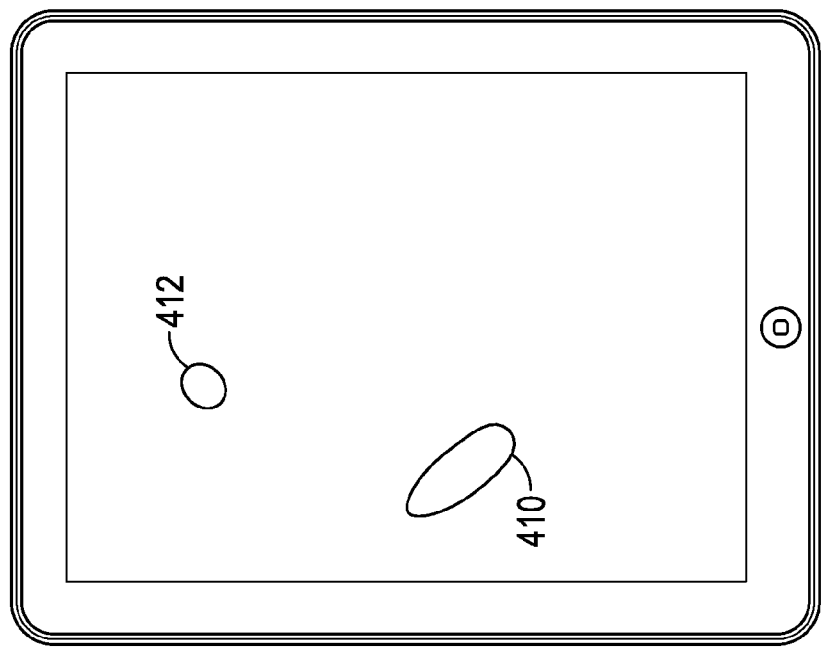
FIGS. 4a and 4b illustrate the exemplary touches of FIGS. 3a through 3d as captured in a touch image that can be made on a touch sensor panel according to examples of the disclosure.
Figure 4A:
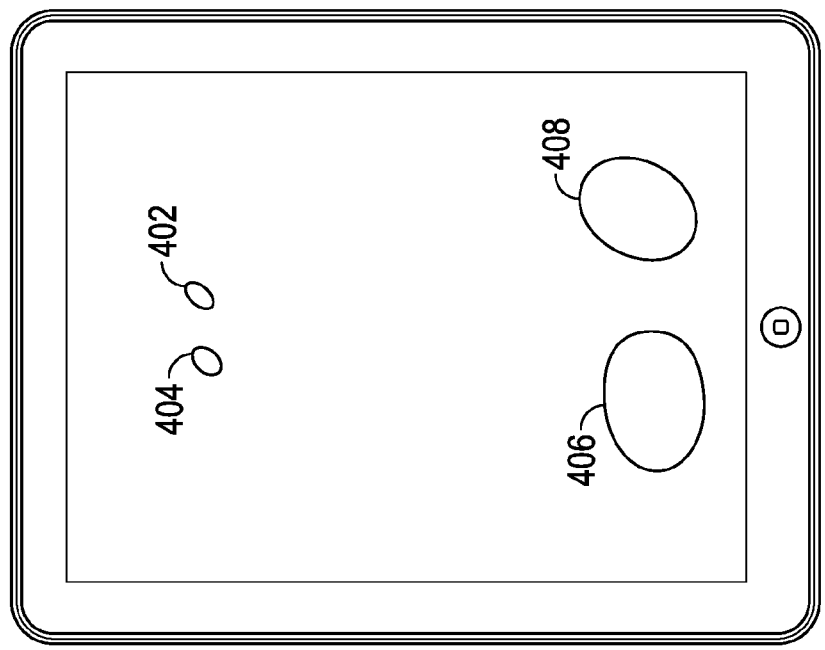

FIGS. 4a and 4b illustrate the exemplary touches of FIGS. 3a through 3d as captured in a touch image that can be made on a touch sensor panel according to examples of the disclosure. As illustrated in FIG. 4a, the touch of FIGS. 3a and 3b in which a palm and two fingers are touching the touch sensor panel 304 can appear as a set of circles 402, 404, 406 and 408. Circles 402 and 404 can correspond to the two finger tips while circles 406 and 408 can correspond to the areas of the palm in contact with the touch sensor panel. As illustrated in FIG. 4b, the touch of FIGS. 3c and 3d in which a thumb and finger are touching the touch sensor panel 304 can appear as an ellipse 410 and a circle 412. The ellipse 410 can correspond to the thumb while circle 412 can correspond to the finger in contact with the touch sensor panel.

Figure 5:
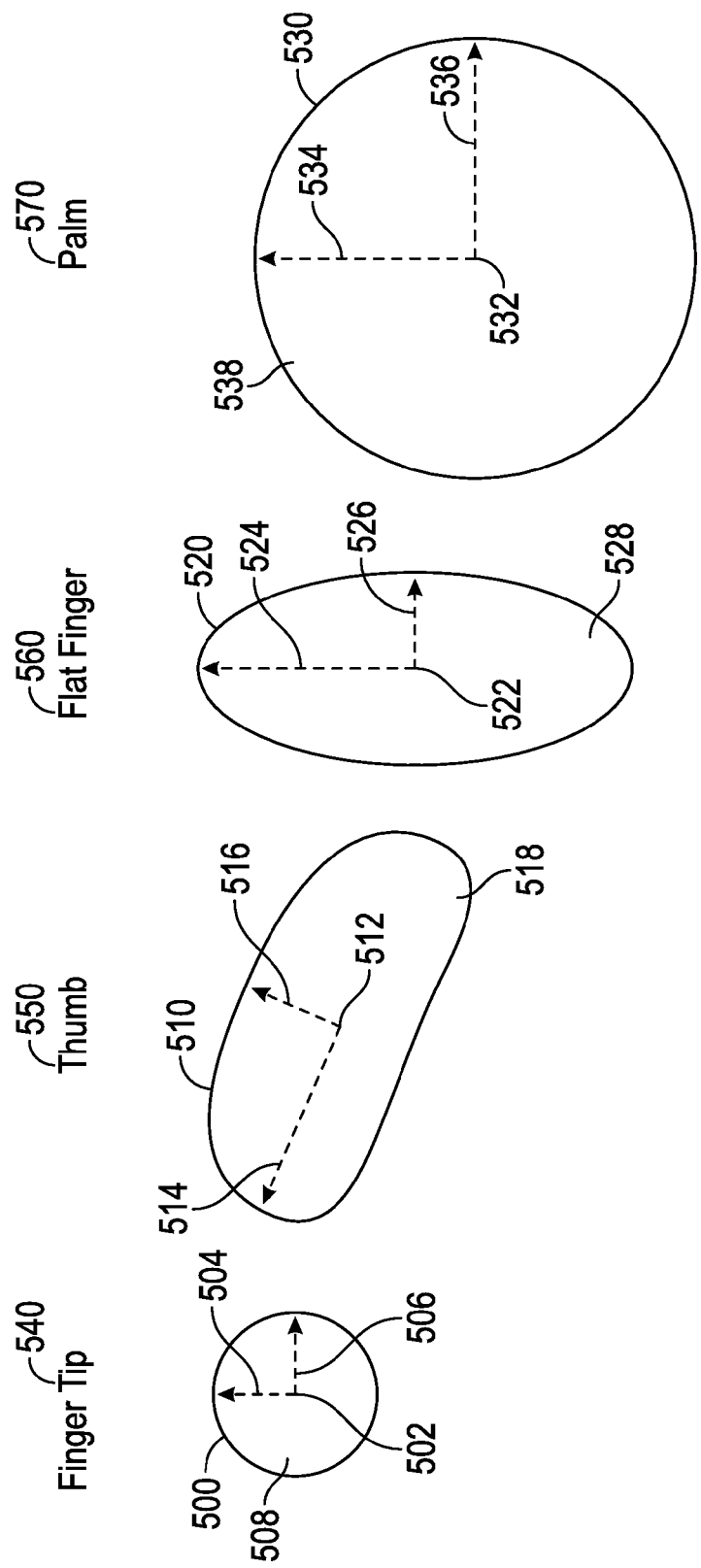
FIG. 5 illustrates exemplary touch images of portions of a user's hand according to examples of the disclosure.

FIG. 5 illustrates exemplary touch images of portions of a user's hand according to examples of the disclosure. For instance, a fingertip 540 as captured in a touch image can be defined as having centroid 502 at the center of mass of the touch with major and minor radii 504 and 506 defining the approximate boundaries of touch area 508. The fingertip 540 can have an elliptical, almost circular shape, where the major and minor radii 504 and 506 can be approximately the same, indicative of a detected touch of a finger tip.

A thumb 550 as captured in a touch image can be defined as having centroid 512 at the center of mass of the touch with major and minor radii 514 and 516 defining the approximate boundaries of touch area 518. The touch 510 can have an elliptical shape, where the major and minor radii 514 and 516 can be oriented substantially diagonally and the major radius can be longer than the minor radius, indicative of a detected touch of a thumb. The touch area 518 of the touch 510 can also be larger than the touch area 508 of the fingertip 540.

A flat finger 560 (a finger in which the palm side of the finger is fully making contact with the touch sensor panel) as captured in a touch image can be defined as having centroid 522 at the center of mass of the touch, with major and minor radii 524 and 526 defining the approximate boundaries of touch area 528. The touch 520 can have an elliptical shape, where the major radius 524 can be longer than the minor radius 526, indicative of a detected touch of a flat finger. The centroid 522 of the touch 520 can be lower in the y-direction than the centroid 502 of the fingertip 540, indicating a more elongated touch area. The touch area 528 of the touch 520 can also be larger than the touch area 508 of the touch 500.

Palm 570 as captured in a touch image can be defined as having centroid 532 at the center of mass of the touch with major and minor radii 534 and 536 defining the approximate boundaries of touch area 538. The palm 570 can have an elliptical, almost circular shape, where the major and minor radii 534 and 536 can be approximately the same and longer than the major and minor radii 504 and 506, indicative of a detected touch of a palm. The centroid 532 of the touch 530 can be lower in the y-direction than the centroids of the other touches. The major and minor radii 534 and 536 can be longer than the radii of the other touches. The touch area 538 of the touch 530 can also be larger than the touch areas of the other touches.

Figure 6:
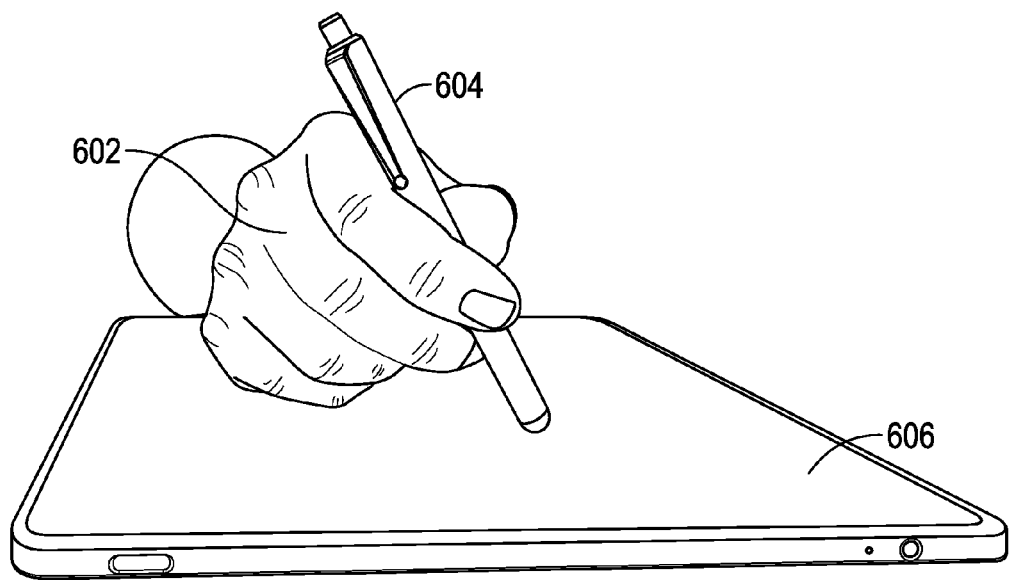
FIG. 6 illustrates an exemplary touch on a touch sensor panel by a user's hand and stylus according to examples of the disclosure.

When a stylus is being used to create inputs on a touch sensor panel, other types of touches with corresponding shapes may be found in an acquired touch image. FIG. 6 illustrates an exemplary touch on a touch sensor panel by a user's hand and stylus according to examples of the disclosure. As illustrated, a hand 602 grasping a stylus 604 can make contact with the touch sensor panel 606. Specifically, the side of the hand 602 as well as the tip of the stylus 604 can make contact with the touch sensor panel 606. In some examples, the hand 602 can be grasping the stylus 604 such that the side of the hand and some knuckles pertaining to various fingers can be in contact with the touch sensor panel 606 in addition to the stylus tip.

Figure 7B:
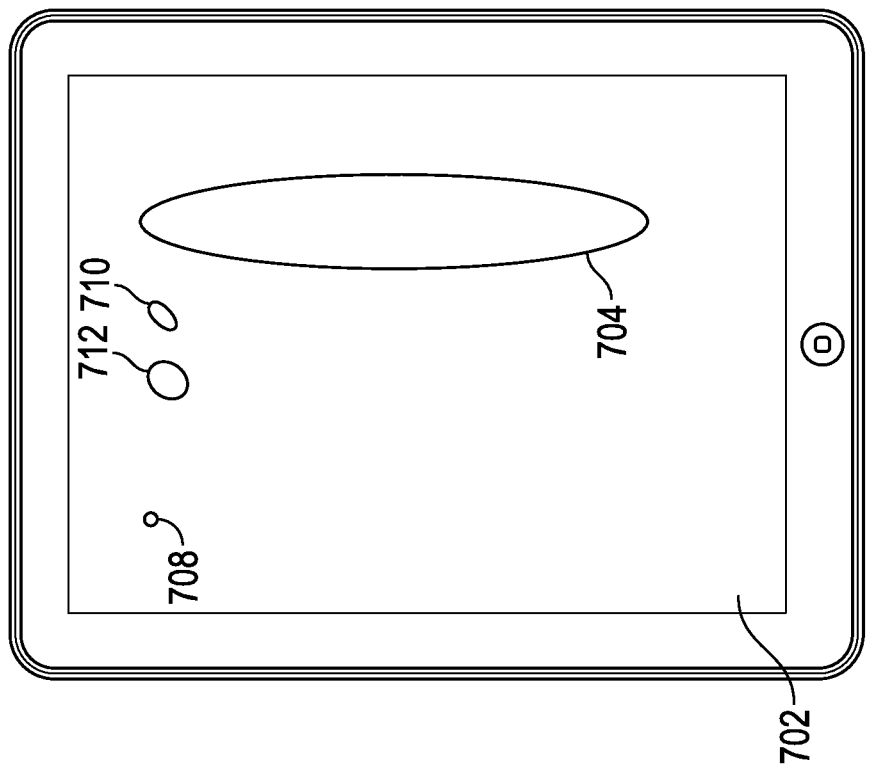
FIGS. 7a and 7b illustrate exemplary touch images of portions of a user's hand and stylus according to examples of the disclosure.
Figure 7A:
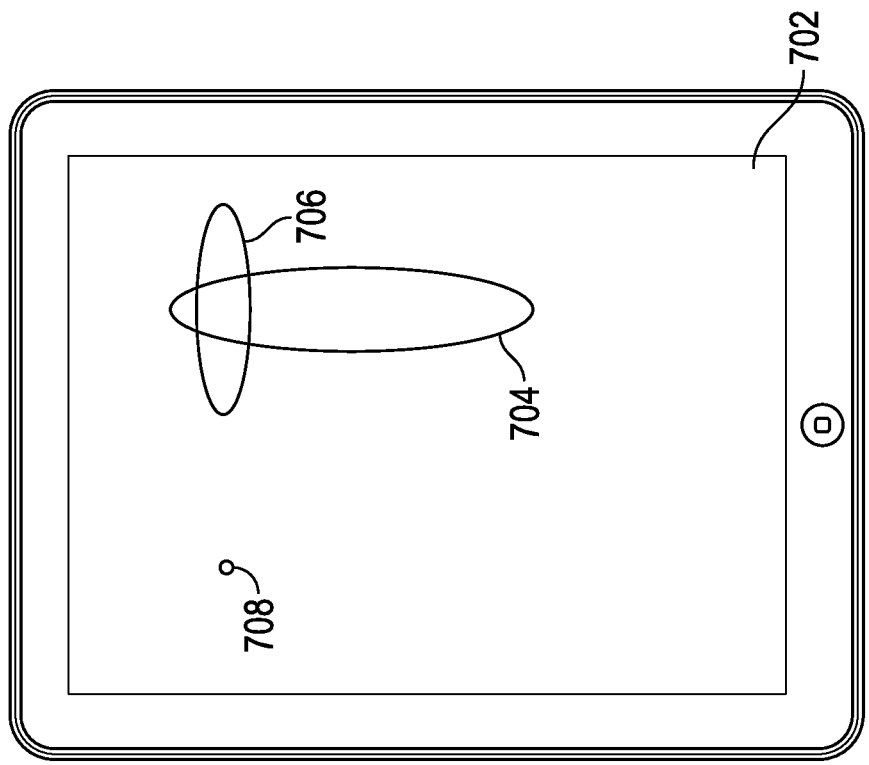

FIGS. 7a and 7b illustrate exemplary touch images of portions of a user's hand and stylus according to examples of the disclosure. FIG. 7a can depict a touch image left by a user's hand and stylus in which only the side of the user's hand and the stylus tip has made contact with the touch sensor panel. In the example of FIG. 7a, the side of the user's hand can be approximated by the touch sensor panel as two separate ellipses 704 and 706. Ellipse 704 can correspond to the side of the hand beginning from the wrist to the lowermost knuckle (i.e., the knuckle closest to the wrist) of the pinky finger. Ellipse 706 can correspond to the side of the hand that begins at the lowermost knuckle of the pinky finger to the middle knuckle of the pinky finger. In this way, the whole side of the hand that is in contact with the touch sensor panel while the hand is grasping a stylus can be accounted for in a touch image. The tip of the stylus that the user is grasping and that is making contact with the touch sensor panel 702 can be approximated by the touch sensor panel as a circle 708.

FIG. 7b can depict a touch image left by a user's hand and stylus in which the side of the user's hand, some knuckles of the user's hand and the stylus tip has made contact with the touch sensor panel 702. In the example of FIG. 7b, the side of the user's hand can be approximated by a single ellipse 704. Ellipse 704 can correspond to the side of the hand beginning from the wrist to the lowermost knuckle of the pinky finger. In addition to the side of the hand, one or more knuckles of the user may be in contact with the touch sensor panel 702. Each knuckle can be approximated by a single circle such as those depicted at 710 and 712. The tip of the stylus that the user is grasping and that is making contact with the touch sensor panel 702 can be approximated by the touch sensor panel as a circle 708.

Figure 8A:
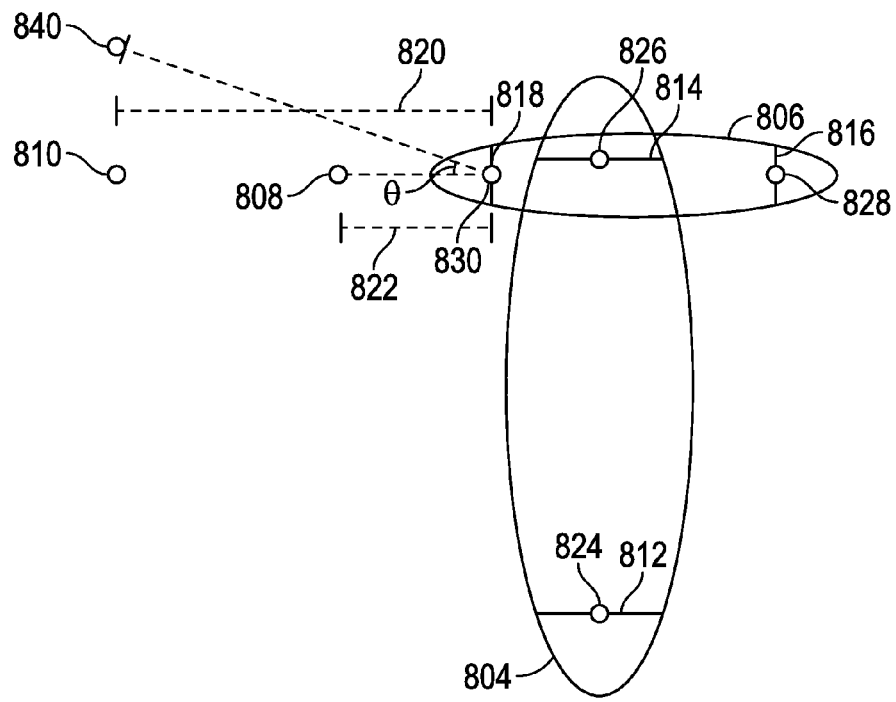
FIG. 8a illustrates an exemplary method for determining a tilt of the stylus relative to a touch sensor panel according to examples of the disclosure.

FIG. 8a illustrates an exemplary method for determining a tilt of the stylus relative to a touch sensor panel according to examples of the disclosure. In the example of FIG. 8a, the user's hand can appear on a touch image to be composed of two ellipses 804 and 806. A processor (not pictured) can analyze ellipses 804 and 806 to determine the major and minor radii as well as the foci of both ellipses. For example, the processor can determine that ellipse 804 has foci 824 and 822 and that ellipse 806 has foci 828 and 830. The processor can draw imaginary lines 812 and 814 that correspond to ellipse 804. The imaginary lines 812 and 814 can run through the foci of ellipse 804 parallel to the minor axis of the ellipse. The processor can draw imaginary lines 816 and 818 that correspond to ellipse 806. The imaginary lines 816 and 818 can run through the foci of ellipse 804, parallel to the minor axis of the ellipse.

The imaginary lines 812, 814, 816 and 818 can be used to estimate the size of a user's hand. For instance the distance between lines 812 and 814 can be proportional to the size of the user's hand. The farther apart lines 812 and 814 are from each other, the larger the user's hand is. An estimation of the user's hand size can be useful to determining the tilt of the stylus as will be discussed further below.

The stylus tip can be represented by circle 808. The tilt of the stylus can be proportional to the distance between the stylus tip 808 and the user's hand as represented by ellipses 804 and 806. In one example, a distance can be measured from the stylus tip 808 and the imaginary line 818. This distance as depicted by 822 can be used to estimate the tilt of the stylus. As an example, the normal distance between a hand and a stylus at various stylus tilt angles can be empirically determined. The distance 822 between stylus tip 808 and imaginary line 818 can be compared against the empirically obtained values and a determination can be made as to the stylus tilt angle. For instance, stylus tip 808 can be 5 cm from imaginary line 818 which can correspond to a 90° tilt (i.e., the angle between the stylus body and the touch sensor panel). In another example, if the stylus tilt is found to be at point 810 which for example is 7 cm away from line 818 as depicted at 820, then the device may determine that that the stylus tilt is 60°. As the location of the stylus tip goes away from the hand, the angle can decrease proportionately. As the location of the stylus tip comes closer to the hand, the angle can increase. In some examples, the tilt can also be a function of the angle between the stylus tip and the hand in addition to the distance as depicted at 820. The angle θ between the stylus tip and a line parallel to the major axis of ellipse 806 can be used to estimate the angle of a stylus' tilt. The tilt can be determined by comparing it to empirical data as described above.

The distance between the stylus tip and the hand and the corresponding determined stylus tilt can be normalized for hand size. As an example, if it is empirically determined that a hand that produces ellipses on touch image that measures 4 cm and 8 cm (as measured by the distance between the imaginary lines discussed above) will have a stylus that is at a 90° tilt at 5 cm distance, and 60° tilt at a 7 cm distance, then a hand that measures at half the size (i.e., ellipses that measure 2 cm and 4 cm) will have a tilt of 30° if the stylus tip is at a 7 cm distance. While the example above is described in terms of a proportional and linear relationship between size and stylus tilt, the disclosure is not so limited and can include non-linear relationships such as exponential or logarithmic.

Figure 8B:
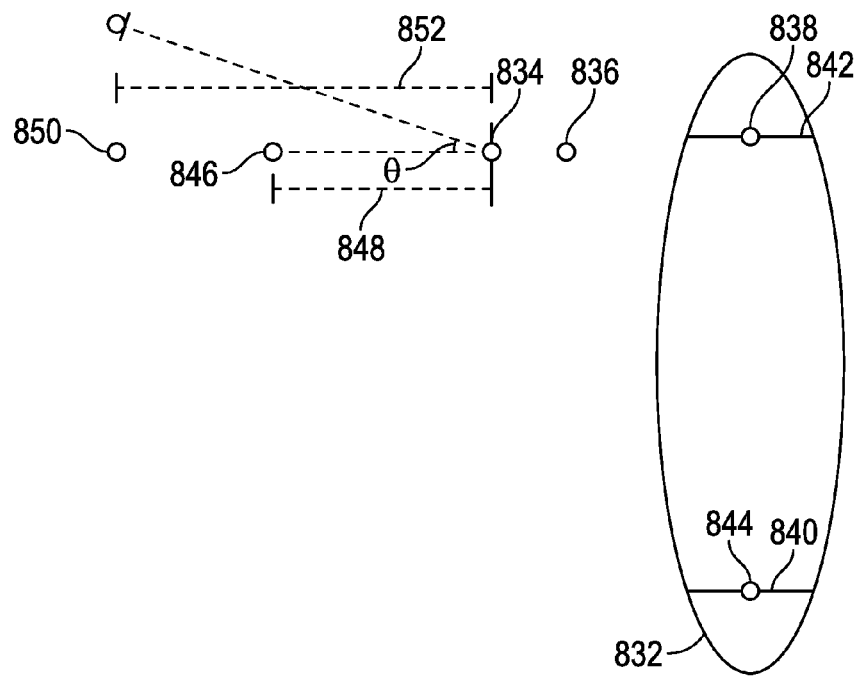
FIG. 8b illustrates another exemplary method for determining a tilt of the stylus relative to a touch sensor panel according to examples of the disclosure.

FIG. 8b illustrates another exemplary method for determining a tilt of the stylus relative to a touch sensor panel according to examples of the disclosure. The example illustrated by FIG. 8b can correspond to a touch image like the one illustrated in FIG. 7b. In the example of FIG. 8b, the user's hand can appear on a touch image to be composed of an ellipse (representing the side of the hand) with a plurality of knuckles represented by circles. The touch image of FIG. 8b illustrates two knuckles 834 and 836 as an example, but the disclosure is not so limited and can include touch image with one knuckle, three knuckles, etc. A processor (not pictured) can analyze ellipse 832 to determine the major and minor radii as well as the foci of the ellipse. For example, the processor can determine that ellipse 832 has foci 838 and

840. The processor can draw imaginary lines 842 and 844 that run through the foci of ellipse 832, parallel to the minor axis of the ellipse. The imaginary lines 842 and 844 can be used to estimate the size of a user's hand using the same process described above in reference to FIG. 8*a*.

The stylus tip can be represented by circle 846. The tilt of the stylus can be proportional to the distance between the stylus tip 846 and the closest knuckle to the stylus tip. In the example of FIG. 8*b*, knuckle 834 can be the closest knuckle used to estimate the tilt of the stylus. In one example, a distance can be measured from the stylus tip 846 to the centroid of knuckle 834. The distance as depicted by 848 can be used to estimate the tilt of the stylus. As an example, the normal distance between a knuckle and stylus at various stylus tilt angles can be empirically determined. The distance 848 between stylus tip 846 and knuckle 834 can be compared against the empirically obtained values and a determination can be made as to the stylus tilt angle. For instance, stylus tip 846 can be 5 cm from knuckle 834 which can correspond to a 90° tilt. In another example, if the stylus is found to be at point 850 which for example is 7 cm away from knuckle 834 as depicted at 852, then the device may determine that the stylus tilt is 60°. As the location of the stylus tip goes away from the knuckle, the angle can increase. In some examples, the tilt can also be a function of the angle between the stylus tip and the hand, in addition to the distance as depicted at 859. The angle θ between the stylus tip an knuckle 834 can be used to estimate the angle of a stylus' tilt. The tilt can be determined by comparing it to empirical data as described above.

The example of FIG. 8*b* illustrates a situation in which the touch image contains only two knuckles. In some examples, there can be three knuckles or even only one knuckle. In the case of three knuckles, a distance of 5 cm between the stylus tip and the closest knuckle may mean a different tilt angle than a distance of 5 cm between the stylus tip and the closest knuckle in a two knuckle scenario. Therefore, in some examples, the estimation of stylus tilt may depend not only on the distance between the stylus tip and the closest knuckle, but also on how many knuckles are present in the touch image.

Figure 9:
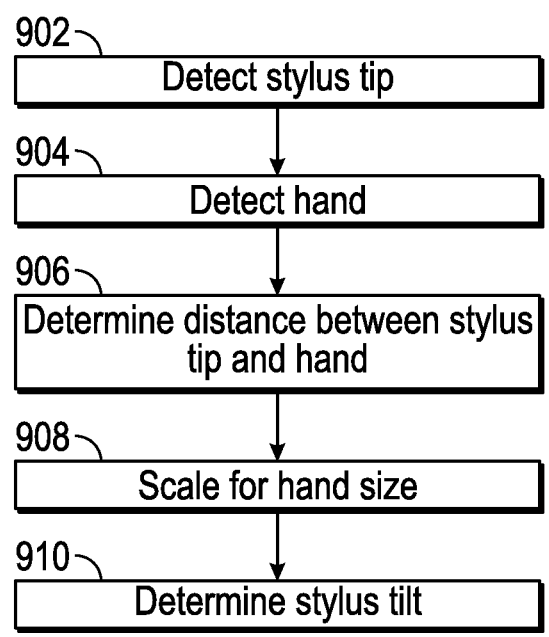
FIG. 9 illustrates an exemplary flowchart for determining a tilt of the stylus relative to a touch sensor panel according to examples of the disclosure.

FIG. 9 illustrates an exemplary flowchart for determining a tilt of the stylus relative to a touch sensor panel according to examples of the disclosure. At step 902, a stylus tip can be detected on the touch sensor panel. At step 904, a corresponding hand that is grasping the stylus can be detected on the touch sensor panel. The detected hand can be approximated as ellipses as discussed above. A determination of the size of each ellipse can be made. At step 906, a distance between the detected stylus tip and the detected hand can be measured as discussed above. At step 908, the measured hand size and distance between the stylus tip and hand can be scaled according to the discussion above. Finally, at step 910 the stylus tilt can be determined by comparing the scaled values of step 908 to empirically measured data.

Figure 10:
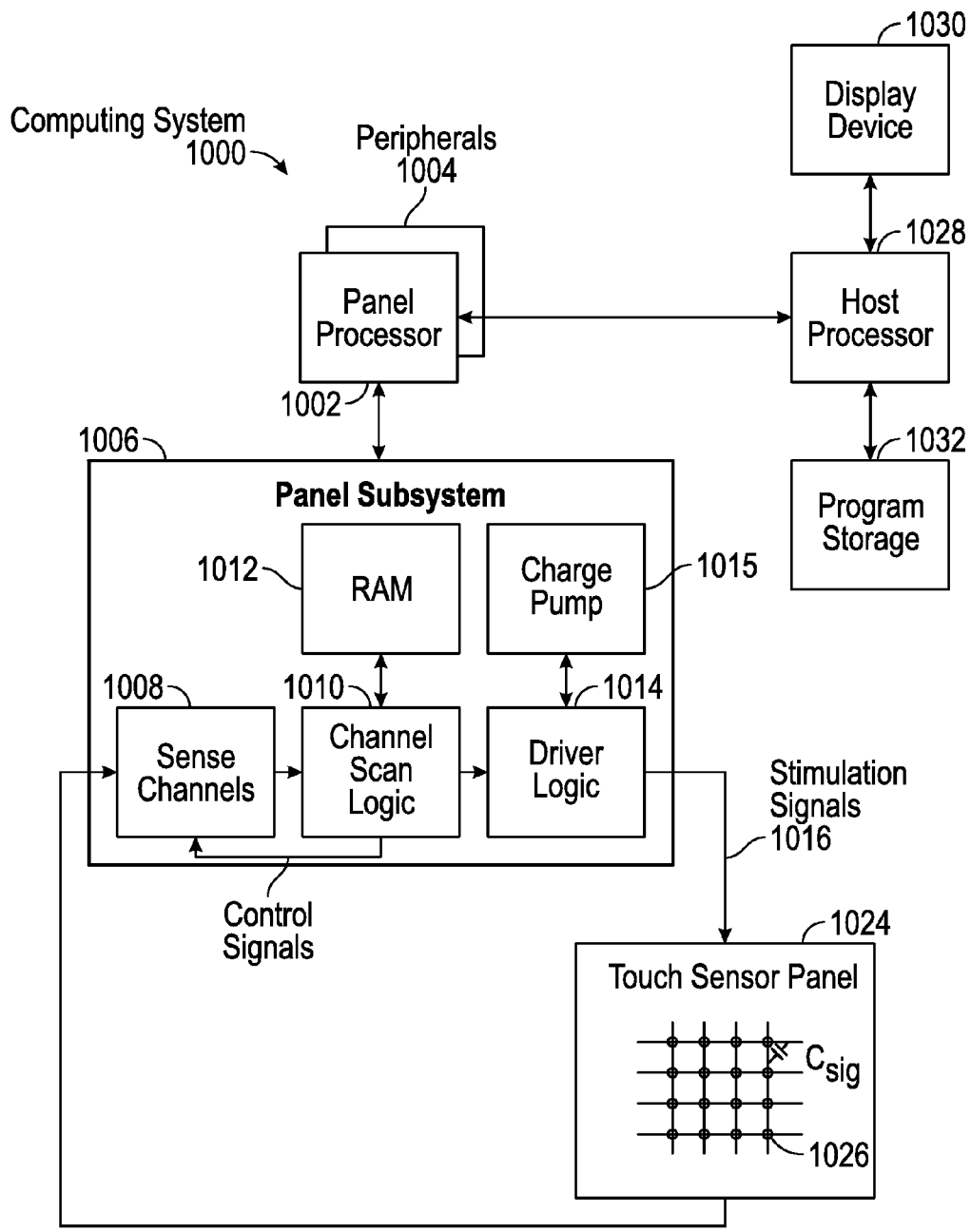
FIG. 10 illustrates an exemplary computing system implementing the algorithm for detecting a stylus' orientation relative to a touch sensor panel according to examples of the disclosure.

FIG. 10 illustrates an exemplary computing system implementing the algorithm for detecting a stylus' orientation relative to a touch sensor panel according to examples of the disclosure. In the example of FIG. 10, computing system 1000 can include one or more panel processors 1002, which can execute software or firmware implementing the algorithm for detection of an orientation of a stylus relative to a touch sensitive surface according to examples of the disclosure, and peripherals 1004, and panel subsystem 1006. Peripherals 1004 can include, but are not limited to, random access memory (RAM) or other types of memory or storage, watchdog timers and the like. Panel subsystem 1006 can include, but is not limited to, one or more sense channels 1008, channel scan logic (analog or digital) 1010 and driver logic (analog or digital) 1014. Channel scan logic 1010 can access RAM 1012, autonomously read data from sense channels 1008 and provide control for the sense channels. In addition, channel scan logic 1010 can control driver logic 1014 to generate stimulation signals 1016 at various phases that can be simultaneously applied to drive lines of touch sensor panel 1024. Panel subsystem 1006 can operate at a low digital logic voltage level (e.g. 1.7 to 3.3V). Driver logic 1014 can generate a supply voltage greater that the digital logic level supply voltages by cascading two charge storage devices, e.g., capacitors, together to form charge pump 1015. Charge pump 1015 can be used to generate stimulation signals 1016 that can have amplitudes of about twice the digital logic level supply voltages (e.g. 3.4 to 6.6V). Although FIG. 10 shows charge pump 1015 separate from driver logic 1014, the charge pump can be part of the driver logic. In some examples, panel subsystem 1006, panel processor 1002 and peripherals 1004 can be integrated into a single application specific integrated circuit (ASIC).

Touch sensor panel 1024 can include a capacitive sensing medium having a plurality of drive lines and a plurality of sense lines, although other sensing media can also be used. The drive and sense lines can be formed from a transparent conductive medium such as Indium Tin Oxide (ITO) or Antimony Tin Oxide (ATO), although other transparent and non-transparent materials such as copper can also be used. The drive and sense lines can be formed on a single side of a substantially transparent substrate, on opposite sides of the substrate, or on two separate substrates separated by the dielectric material. Each intersection of drive and sense lines can represent a capacitive sensing node and can be viewed as picture element (pixel) 1026, which can be particularly useful when touch sensor panel 1024 is viewed as capturing an "image" of touch. (In other words, after panel subsystem 1006 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between the drive and sense lines and local system ground appears as a stray capacitance Cstray and the capacitance at the intersections of the drive and sense lines, i.e., the pixels, as a mutual signal capacitance Csig when the given drive line is stimulated with an alternating current (AC) signal. The presence of a finger or other object near or on the touch sensor panel can be detected by measuring changes to a signal charge present at the pixels being touched, which is a function of Csig. Each sense line of touch sensor panel 1024 can drive sense channel 1008 in panel subsystem 1006.

Touch sensor panel 1024 can cover a portion or substantially all of a surface of an input device, such as a mouse.

Computing system 1000 can also include host processor 1028 for receiving outputs from panel processor 1002 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1028 can execute software or firmware implementing the algorithm for detection of an orientation of a stylus relative to a touch sensitive surface according to examples of the disclosure. Host processor 1028 can also perform additional functions that may not be related to panel processing, and can be coupled to program storage 1032 and display device 1030 such as an LCD display for providing a UI to a user of the device. Display device 1030 together with touch sensor panel 1024, when located partially or entirely under the touch sensor panel, can form a touch screen.

Note that one or more of the functions described above can be performed by firmware stored in memory (e.g. one of the peripherals 1004 in FIG. 10) and executed by panel processor 1002, or stored in program storage 1032 and executed by host processor 1028. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the sensor panel is not limited to a touch sensor panel, as described in FIG. 10, but may be a proximity sensor panel or any other sensor panel capable of sensing a touch or hover event and detecting a palm touch according to examples of the disclosure. Furthermore, although the touch sensors in the touch sensor panel may be described herein in terms of an orthogonal array of touch sensors having rows and columns, it should be understood that examples of this disclosure are not limited to orthogonal arrays, but can be generally applicable to touch sensors arranged in any number of dimensions and orientations, including diagonal, concentric circle, and three-dimensional and random orientations. In addition, the touch sensor panel described herein can be either a single-touch or a multi-touch sensor panel.

Therefore, according to the above, some examples of the disclosure are directed to a method for estimating an orientation of a stylus relative to a touch sensor panel. The method can comprise acquiring a touch image from the touch sensor panel, determining a location of a stylus tip from the acquired touch image, determining a location of a hand grasping the stylus from the acquired touch image, and estimating the orientation of the stylus relative to the touch sensor panel based on the determined location of the stylus tip and the determined location of the hand grasping the stylus. Additionally or alternatively to one or more examples disclosed above, determining a location of a hand grasping the stylus from the acquired touch image can include approximating a portion of the acquired touch image into one or more ellipses, the one or more ellipses representing the portion of the hand grasping the stylus that can be in contact with the touch sensor panel. Additionally or alternatively to one or more examples disclosed above, determining a location of a hand grasping the stylus from the acquired touch image can further include determining a major and minor axis for each of the one or more ellipses and one or more foci of the one or more ellipses. Additionally or alternatively to one or more examples disclosed above, estimating the orientation of the stylus relative to the touch sensor panel based on the determined location of the stylus tip and the determined location of the hand grasping the stylus can include determining a distance between the determined location of the stylus tip and the one or more foci of the one or more ellipses. Additionally or alternatively to one or more examples disclosed above, estimating the orientation of the stylus relative to the touch sensor panel based on the determined location of the stylus tip and the determined location of the hand grasping the stylus can include determining a distance between the determined location of the stylus tip and the determined location of the hand grasping the stylus. Additionally or alternatively to one or more examples disclosed above, estimating the orientation of the stylus relative to the touch sensor panel can further include comparing the determined distance between the determined location of the stylus tip and the determined location of the hand grasping the stylus to a set of empirical data. Additionally or alternatively to one or more examples disclosed above, the method can further comprise determining a size of the hand grasping the stylus. Additionally or alternatively to one or more examples disclosed above, the method can further comprise adjusting the estimated stylus orientation based on the determined size of the hand grasping the stylus.

Other examples of the disclosure are directed to a touch sensitive device configured to estimate an orientation of a stylus. The device can comprise a touch sensor panel. The device can also comprise a processor capable of acquiring a touch image from the touch sensor panel, determining a location of a stylus tip from the acquired touch image, determining a location of a hand grasping the stylus from the acquired touch image, and estimating the orientation of the stylus relative to the touch sensor panel based on the determined location of the stylus tip and the determined location of the hand grasping the stylus. Additionally or alternatively to one or more examples disclosed above, determining a location of a hand grasping the stylus from the acquired touch image can include approximating a portion of the acquired touch image into one or more ellipses, the one or more ellipses representing the portion of the hand grasping the stylus that can be in contact with the touch sensor panel. Additionally or alternatively to one or more examples disclosed above, determining a location of a hand grasping the stylus from the acquired touch image can further include determining a major and minor axis for each of the one or more ellipses and one or more foci of the one or more ellipses. Additionally or alternatively to one or more examples disclosed above, estimating the orientation of the stylus relative to the touch sensor panel based on the determined location of the stylus tip and the determined location of the hand grasping the stylus can include determining a distance between the determined location of the stylus tip and the one or more foci of the one or more ellipses. Additionally or alternatively to one or more examples disclosed above, estimating the orientation of the stylus relative to the touch sensor panel based on the determined location of the stylus tip and the determined location of the hand grasping the stylus can include determining a distance between the determined location of the stylus tip and the determined location of the hand grasping the stylus. Additionally or alternatively to one or more examples disclosed above, estimating the orientation of the stylus relative to the touch sensor panel can further include comparing the determined distance between the determined location of the stylus tip and the determined location of the hand grasping the stylus to a set of empirical data. Additionally or alternatively to one or more examples disclosed above, the processor can be further capable of determining a size of the hand grasping the stylus. Additionally or alternatively to one or more examples disclosed above, the processor can be further capable of adjusting the estimated stylus orientation based on the determined size of the hand grasping the stylus.

Other examples of the disclosure are directed to a non-transitory computer readable storage medium having stored thereon a set of instructions for estimating a tilt of a stylus in contact with a touch sensor panel, that when executed by a processor can cause the processor to acquire a touch image from the touch sensor panel, determine a location of a stylus tip from the acquired touch image, determine a location of a hand grasping the stylus from the acquired touch image; and estimate an orientation of the stylus relative to the touch sensor panel based on the determined location of the stylus tip and the determined location of the hand grasping the stylus. Additionally or alternatively to one or more examples disclosed above, determining a location of a hand grasping the stylus from the acquired touch image can include approximating a portion of the acquired touch image into one or more ellipses, the one or more ellipses representing the portion of the hand grasping the stylus that can be in contact with the touch sensor panel. Additionally or alternatively to one or more examples disclosed above, determining a location of a hand grasping the stylus from the acquired touch image can further include determining a major and minor axis for each of the one or more ellipses and one or more foci of the one or more ellipses. Additionally or alternatively to one or more examples disclosed above, estimating the orientation of the stylus relative to the touch sensor panel based on the determined location of the stylus tip and the determined location of the hand grasping the stylus can include determining a distance between the determined location of the stylus tip and the one or more foci of the one or more ellipses. Additionally or alternatively to one or more examples disclosed above, estimating the orientation of the stylus relative to the touch sensor panel based on the determined location of the stylus tip and the determined location of the hand grasping the stylus can include determining a distance between the determined location of the stylus tip and the determined location of the hand grasping the stylus. Additionally or alternatively to one or more examples disclosed above, estimating the orientation of the stylus relative to the touch sensor panel can further include comparing the determined distance between the determined location of the stylus tip and the determined location of the hand grasping the stylus to a set of empirical data. Additionally or alternatively to one or more examples disclosed above, the processor can be further caused to determine a size of the hand grasping the stylus. Additionally or alternatively to one or more examples disclosed above, the processor can be further be caused to adjust the estimated stylus orientation based on the determined size of the hand grasping the stylus.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A method for estimating an orientation of a stylus relative to a touch sensor panel, the method comprising:
    acquiring a touch image from the touch sensor panel;
    determining a location of a stylus tip from the acquired touch image;
    determining a location of a hand grasping the stylus from the acquired touch image;
    determining an angle between the location of the stylus tip and the location of the hand grasping the stylus;
    determining a size of the hand grasping the stylus; and
    estimating the orientation of the stylus relative to the touch sensor panel based on the determined location of the stylus tip, the determined location of the hand grasping the stylus, the determined angle between the location of the stylus tip and the location of the hand grasping the stylus and the determined size of the hand grasping the stylus.

2. The method of claim 1, wherein determining a location of a hand grasping the stylus from the acquired touch image includes approximating a portion of the acquired touch image into one or more ellipses, the one or more ellipses representing the portion of the hand grasping the stylus that is in contact with the touch sensor panel.

3. The method of claim 2, wherein determining a location of a hand grasping the stylus from the acquired touch image further includes determining a major and minor axis for each of the one or more ellipses and one or more foci of the one or more ellipses.

4. The method of claim 3, wherein estimating the orientation of the stylus relative to the touch sensor panel based on the determined location of the stylus tip and the determined location of the hand grasping the stylus includes determining a distance between the determined location of the stylus tip and the one or more foci of the one or more ellipses.

5. The method of claim 1, wherein estimating the orientation of the stylus relative to the touch sensor panel based on the determined location of the stylus tip and the determined location of the hand grasping the stylus includes determining a distance between the determined location of the stylus tip and the determined location of the hand grasping the stylus.

6. The method of claim 5, wherein estimating the orientation of the stylus relative to the touch sensor panel further includes comparing the determined distance between the determined location of the stylus tip and the determined location of the hand grasping the stylus to a set of empirical data.

7. The method of claim 1, wherein the size of the hand grasping the stylus is determined based on a distance between foci of an ellipse representing the portion of the hand grasping the stylus.

8. The method of claim 1,
wherein the determined angle between the location of the stylus tip and the location of the hand grasping the stylus is measured with respect to a line parallel to a major axis or a minor axis of an ellipse representing the portion of the hand grasping the stylus.

9. A touch sensitive device configured to estimate an orientation of a stylus, the device comprising:
a touch sensor panel; and
a processor capable of:
acquiring a touch image from the touch sensor panel;
determining a location of a stylus tip from the acquired touch image;
determining a location of a hand grasping the stylus from the acquired touch image;
determining an angle between the location of the stylus tip and the location of the hand grasping the stylus;
determining a size of the hand grasping the stylus; and
estimating the orientation of the stylus relative to the touch sensor panel based on the determined location of the stylus tip, the determined location of the hand grasping the stylus, the determined angle between the location of the stylus tip and the location of the hand grasping the stylus and the determined size of the hand grasping the stylus.

10. The touch sensitive device of claim 9, wherein determining a location of a hand grasping the stylus from the acquired touch image includes approximating a portion of the acquired touch image into one or more ellipses, the one or more ellipses representing the portion of the hand grasping the stylus that is in contact with the touch sensor panel.

11. The device of claim 10, wherein determining a location of a hand grasping the stylus from the acquired touch image further includes determining a major and minor axis for each of the one or more ellipses and one or more foci of the one or more ellipses.

12. The device of claim 11, wherein estimating the orientation of the stylus relative to the touch sensor panel based on the determined location of the stylus tip and the determined location of the hand grasping the stylus includes determining a distance between the determined location of the stylus tip and the one or more foci of the one or more ellipses.

13. The device of claim 9, wherein estimating the orientation of the stylus relative to the touch sensor panel based on the determined location of the stylus tip and the determined location of the hand grasping the stylus includes determining a distance between the determined location of the stylus tip and the determined location of the hand grasping the stylus.

14. The device of claim 13, wherein estimating the orientation of the stylus relative to the touch sensor panel further includes comparing the determined distance between the determined location of the stylus tip and the determined location of the hand grasping the stylus to a set of empirical data.

15. The device of claim 9, the processor further capable of:
determining the size of the hand grasping the stylus based on a distance between foci of an ellipse representing the portion of the hand grasping the stylus.

16. The device of claim 9,
wherein the determined angle between the location of the stylus tip and the location of the hand grasping the stylus is measured with respect to a line parallel to a major axis or a minor axis of an ellipse representing the portion of the hand grasping the stylus.

17. A non-transitory computer readable storage medium having stored thereon a set of instructions for estimating a tilt of a stylus in contact with a touch sensor panel, that when executed by a processor causes the processor to:
acquire a touch image from the touch sensor panel;
determine a location of a stylus tip from the acquired touch image;
determine a location of a hand grasping the stylus from the acquired touch image;
determine an angle between the location of the stylus tip and the location of the hand grasping the stylus;
determine a size of the hand grasping the stylus; and
estimate an orientation of the stylus relative to the touch sensor panel based on the determined location of the stylus tip, the determined location of the hand grasping the stylus, the determined angle between the location of the stylus tip and the location of the hand grasping the stylus and the determined size of the hand grasping the stylus.

18. The non-transitory computer readable storage medium of claim 17, wherein determining a location of a hand grasping the stylus from the acquired touch image includes approximating a portion of the acquired touch image into one or more ellipses, the one or more ellipses representing the portion of the hand grasping the stylus that is in contact with the touch sensor panel.

19. The non-transitory computer readable storage medium of claim 18, wherein determining a location of a hand grasping the stylus from the acquired touch image further includes determining a major and minor axis for each of the one or more ellipses and one or more foci of the one or more ellipses.

20. The non-transitory computer readable storage medium of claim 19, wherein estimating the orientation of the stylus relative to the touch sensor panel based on the determined location of the stylus tip and the determined location of the hand grasping the stylus includes determining a distance between the determined location of the stylus tip and the one or more foci of the one or more ellipses.

21. The non-transitory computer readable storage medium of claim 17, wherein estimating the orientation of the stylus relative to the touch sensor panel based on the determined location of the stylus tip and the determined location of the hand grasping the stylus includes determining a distance between the determined location of the stylus tip and the determined location of the hand grasping the stylus.

22. The non-transitory computer readable storage medium of claim 21, wherein estimating the orientation of the stylus relative to the touch sensor panel further includes comparing the determined distance between the determined location of the stylus tip and the determined location of the hand grasping the stylus to a set of empirical data.

23. The non-transitory computer readable storage medium of claim 17, the processor further caused to:
determine the size of the hand grasping the stylus based on a distance between foci of an ellipse representing the portion of the hand grasping the stylus.

24. The non-transitory computer readable storage medium of claim 17,
wherein the determined angle between the location of the stylus tip and the location of the hand grasping the stylus is measured with respect to a line parallel to a major axis or a minor axis of an ellipse representing the portion of the hand grasping the stylus.

* * * * *